(12) United States Patent
Bunker

(10) Patent No.: US 6,349,918 B1
(45) Date of Patent: Feb. 26, 2002

(54) MOTOR MOUNT INSERT AND METHOD OF FORMING SAME

(76) Inventor: Donald D. Bunker, 32281 Peppertree Bend, San Juan Capistrano, CA (US) 92675

( * ) Notice: Subject to any disclaimer, the term of this patent is extended or adjusted under 35 U.S.C. 154(b) by 0 days.

(21) Appl. No.: 09/473,233

(22) Filed: Dec. 27, 1999

(51) Int. Cl.[7] .................................................. B60K 5/12
(52) U.S. Cl. ................... 248/635; 248/638; 267/140.11
(58) Field of Search ................................ 248/562, 615, 248/634, 635, 638; 267/140.11, 141, 153, 140.3; 180/291

(56) References Cited

U.S. PATENT DOCUMENTS

| | | | |
|---|---|---|---|
| 1,844,755 A | | 2/1932 | Geyer .......................... 248/634 |
| 1,930,310 A | | 10/1933 | Geyer .......................... 248/635 |
| 2,138,176 A | | 11/1938 | Keys ........................... 248/613 |
| 2,308,962 A | | 1/1943 | Riesing ........................ 248/605 |
| 3,702,178 A | * | 11/1972 | Schulz ....................... 267/140.3 |
| 4,183,496 A | * | 1/1980 | Brock et al. ................. 248/638 |
| 5,031,873 A | | 7/1991 | Rau ............................ 248/632 |
| 5,110,081 A | * | 5/1992 | Lang, Jr. ..................... 248/635 |
| 5,215,382 A | | 6/1993 | Kemeny ....................... 384/36 |
| 5,295,671 A | | 3/1994 | Nakagaki et al. ....... 267/140.13 |
| 5,551,661 A | | 9/1996 | Bunker ........................ 248/634 |
| 5,788,206 A | | 8/1998 | Bunker ........................ 248/634 |
| 5,788,207 A | | 8/1998 | Bunker ........................ 248/634 |

FOREIGN PATENT DOCUMENTS

GB 468165 6/1937
GB 672578 5/1952

* cited by examiner

*Primary Examiner*—Anita King
*Assistant Examiner*—Jon A Szumny
(74) *Attorney, Agent, or Firm*—Stetina Brunda Garred & Brucker

(57) ABSTRACT

A motor mount insert for retrofit application to a motor mount. The motor mount is attachable to an engine bracket having a pair of apertures disposed therein, and includes a backing plate and a shell which, when attached to each other, collectively define a cavity having a maximum cavity width and a maximum cavity height. The motor mount insert is positionable between the shell and the backing plate, and comprises a base plate defining a first end having a first pair of tab portions extending therefrom in spaced relation to each other and a second end having a second pair of tab portions extending therefrom in spaced relation to each other. The base plate further defines an elongate bore which extends therethrough. In addition to the base plate, the motor mount insert comprises a resilient material which is molded about the base plate in a manner wherein the first and second pairs of tab portions protrude therefrom. The resilient material is formed to have a maximum material width which is substantially equal to the maximum cavity width of the cavity. The motor mount insert is sized and configured such that the advancement of the engine bracket over the shell subsequent to the motor mount insert being positioned between the backing plate and the shell results in the engagement of the engine bracket to the tab portions of the base plate which facilitates the coaxial alignment of the apertures of the engine bracket with the bore of the base plate.

28 Claims, 6 Drawing Sheets

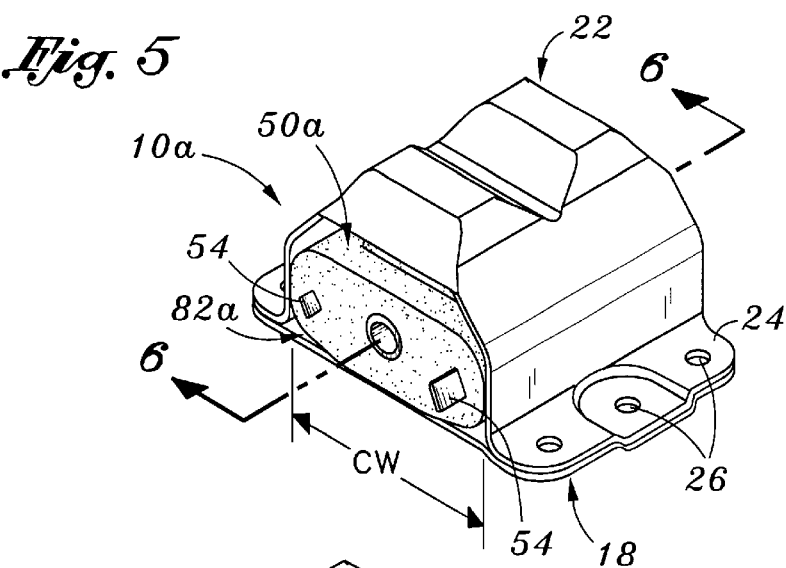
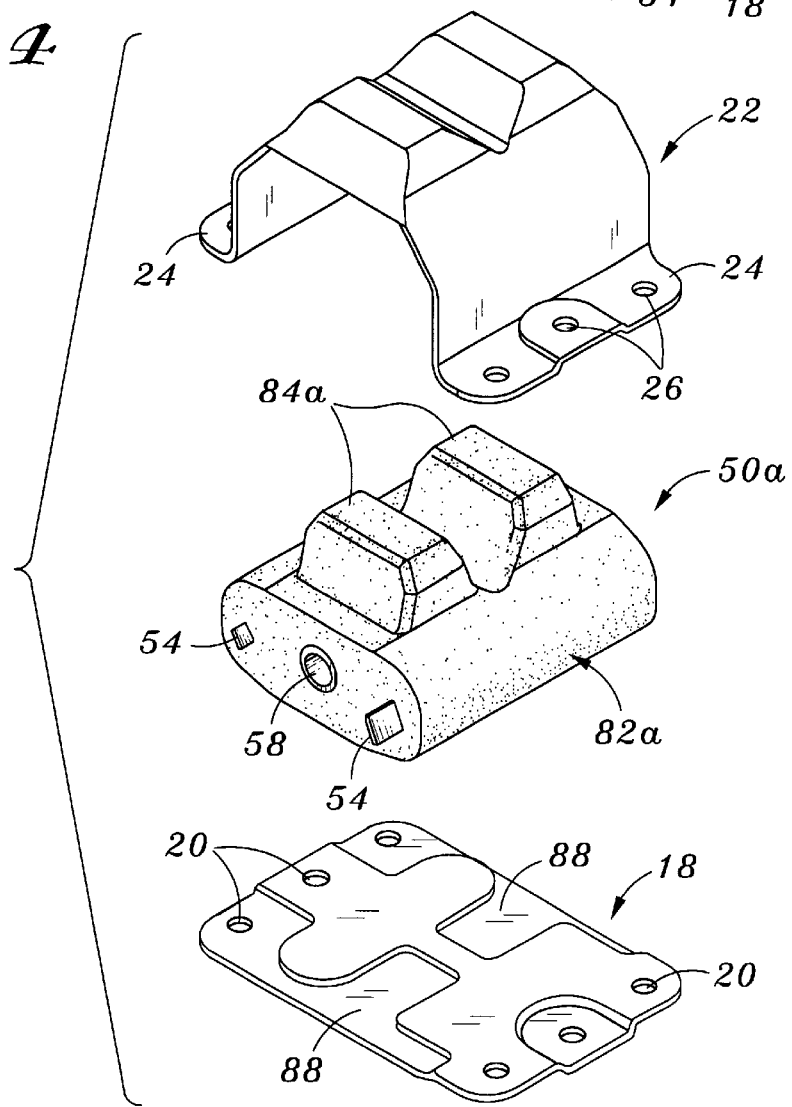

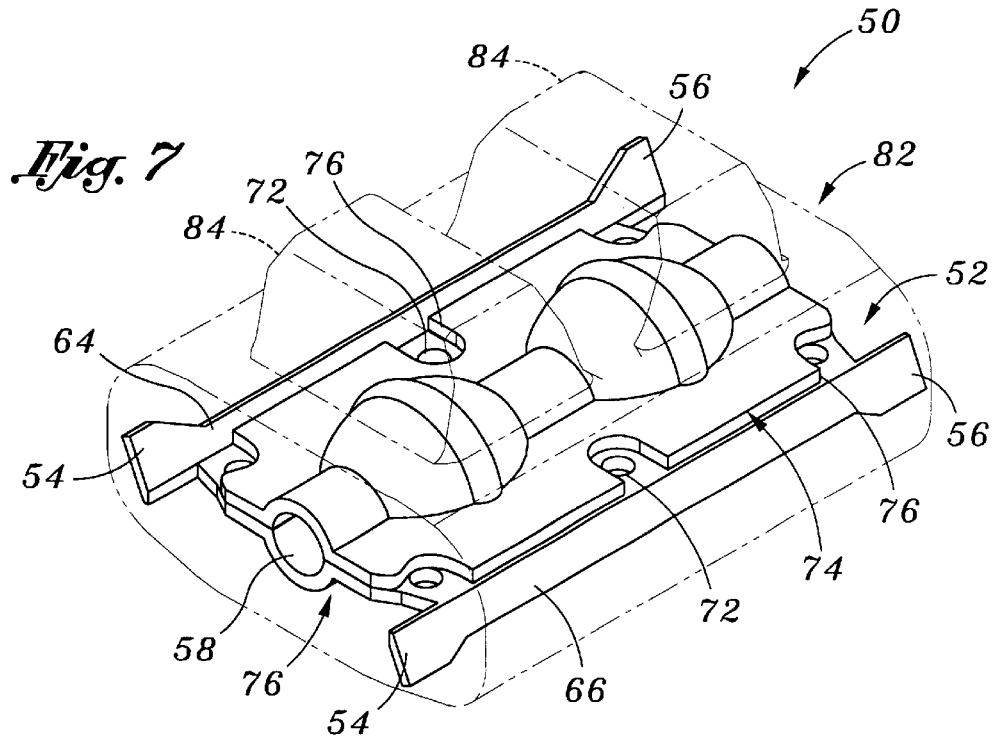
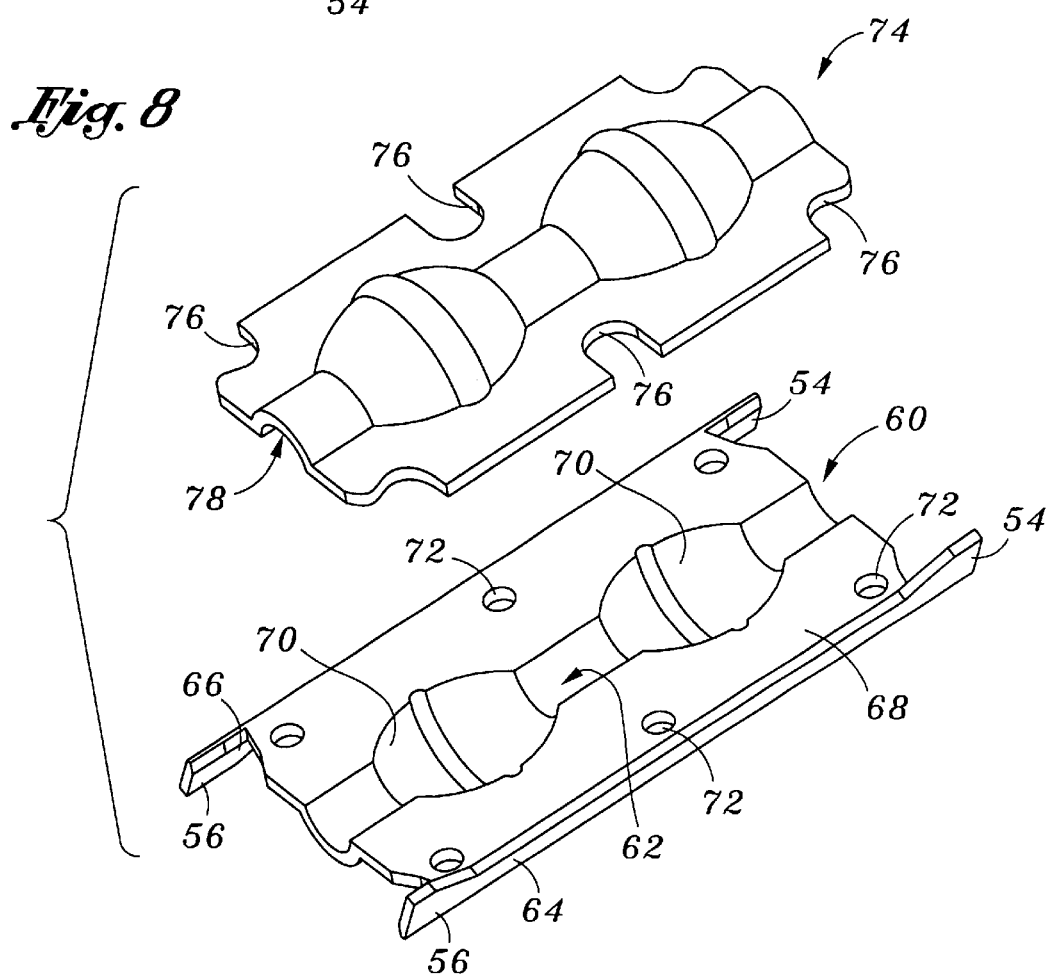

MOTOR MOUNT INSERT AND METHOD OF FORMING SAME

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to automotive mounting devices, and more particularly to a motor mount insert for retrofit application to an automotive motor mount.

As is well known in the automotive industry, automotive engines or motors are normally installed in trucks and automobiles by mounting them to a cross-member of the vehicle frame via a pair of motor mounts. One particular type of prior art motor mount referred to as a "clam shell" type motor mount comprises a metal backing plate and a metal shell which have a rubber core or insert disposed therebetween. The shell is typically spot-welded to the backing plate, with the rubber core having a configuration which is complimentary to that of the shell so as to be maintained between the shell and the backing plate. The attachment of the motor mount to the cross-member is accomplished by positioning the backing plate upon the top surface of the cross-member. Thereafter, a series of mounting bolts are advanced through respective coaxially aligned sets of apertures disposed within the shell, backing plate and cross-member, with nuts then being applied to the exposed ends of the mounting bolts protruding from the side of the cross-member opposite that having the backing plate of the motor mount positioned thereupon. The rubber core of the prior art motor mount is not formed from rubber alone, but rather comprises a metal base plate having rubber molded thereabout. The base plate itself defines an elongate, circularly configured bore which extends therethrough, and two pairs of tabs which are disposed at respective ones of the opposed ends thereof.

The prior art motor mount is specifically configured to cooperatively engage a corresponding engine bracket of the engine or motor. More particularly, the motor mount is configured such that the engine bracket may be advanced thereover in a manner wherein a pair of apertures disposed within the engine bracket are placeable into coaxial alignment with the bore of the base plate of the rubber core. Once such coaxial alignment has been achieved, a long bolt is advanced through the coaxially aligned apertures and bore, thus facilitating the attachment of the engine bracket to the motor mount. The base plate of the rubber core is formed such that the tabs defined thereby engage the engine bracket in a manner which facilitates the coaxial alignment of the apertures of the engine bracket with the bore of the base plate. More particularly, the engine bracket, when advanced over the shell of the motor mount, engages the pair of tabs at each end of the base plate, with such engagement resulting in the apertures of the engine bracket and bore of the base plate being placed into coaxial alignment with each other, thus allowing for the passage of the long bolt therethrough to facilitate the attachment of the engine bracket to the motor mount.

The prior art motor mounts, when used to facilitate the attachment of the engine or motor to the cross-member of the vehicle frame, effectively dampen excess vibration of the engine due the resiliency of the rubber cores thereof. In this respect, movement of the engine or motor and hence the engine brackets is translated into movement of the shells of the motor mounts, with such movement being dampened by the rubber cores thereof.

Although the prior art motor mounts have proven generally suitable for their intended purposes, they possess certain deficiencies which detract from their overall utility. More particularly, as indicated above, the prior art automotive motor mounts of the clam shell type utilize rubber as the resilient material to fabricate the cores thereof. As is well known to those skilled in the art, rubber is susceptible to degradation due to various environmental factors, such as contamination by automotive fluids, e.g., gasoline, oil, transmission fluid, brake fluid, etc., as well as ozone and other atmospheric pollutants. Thus, over time, the rubber cores of the prior art motor mounts typically wear and shrink (as well as being susceptible to other forms of degradation) which substantially reduce or completely impede their efficacy in dampening vibrations and other movements of the motor. As will be recognized, the failure of one or both of the rubber cores of the motor mounts typically results in excess vibration or movement of the motor during operation of the vehicle as could result in damage thereto. Further, the rubber material for the prior art motor mount cores is incapable of applying a substantial pre-load to the shells so as to both desirably increase the stiffness of the motor mount and similarly increase the durability thereof.

With clam shell type motor mounts as currently know in the prior art, once one or both of the rubber cores of the motor mounts become worn, typically the entire motor mount is removed and replaced. As can be appreciated, replacing the entire motor mount as opposed to only the rubber core thereof gives rise to significantly increased costs in the repair operation. Thus, there exists a need in the art for a motor mount insert which can be easily and quickly retrofitted to the shell and backing plate of an existing clam shell type motor mount, thus eliminating the need to replace the entirety of the motor mount.

The present invention overcomes the deficiencies of prior art motor mounts by providing a polyurethane motor mount insert which may be retrofitted to the backing plate and shell of a prior art clam shell type motor mount. More particularly, the motor mount insert of the present invention may be used as a replacement for the rubber core of the prior art motor mount, and operatively positioned between the existing backing plate and shell. The motor mount insert of the present invention itself includes an internal metal base plate which is specifically adapted to allow for the formation of inserts retrofittable to different models of clam shell type motor mounts. The polyurethane construction of the present motor mount insert overcomes the above-described deficiencies associated with the use of rubber, and provides increased durability and reduced susceptibility to failure. These, and other advantages attendant to the present invention, will be discussed in more detail below.

BRIEF SUMMARY OF THE INVENTION

In accordance with the present invention, there is provided a motor mount insert for retrofit application to a motor mount which is attachable to a engine bracket having a pair of apertures disposed therein. The motor mount is of a clam shell type and includes a backing plate and a shell which, when attached to each other, collectively define a cavity having a maximum cavity width and maximum cavity height. The motor mount insert is positionable between the shell and the backing plate upon the removal of the existing prior art rubber core, and secured therebetween when the shell and the backing plate are reattached to each other.

The motor mount insert of the present invention comprises a base plate which defines a first end having a first pair of tab portions extending therefrom in spaced relation to each other, and a second end having a second pair of tab portions extending therefrom in spaced relation to each other. The base plate further defines an elongate bore which extends therethrough. In the preferred embodiment, the base plate itself comprises a generally rectangular first plate section having a first channel formed therein and first and second flange portions extending therefrom in spaced relation to each other. More particularly, the first plate section includes a body portion, with the first and second flange portions extending along and from respective ones of the opposed longitudinal sides of the body portion in opposite directions. The first and second flange portions preferably extend angularly relative to the body portion, and each have opposed ends which define respective ones of the tab portions of the first and second pairs. The tab portions of the first and second pairs defined by respective ones of the opposed ends of the first flange portion preferably exceed the size of the tab portions of the first and second pairs defined by respective ones of the opposed ends of the second flange portion. Additionally, the first channel formed in the body portion of the first plate section is not of a uniform size, but rather defines a spaced pair of enlarged regions.

In addition to the first plate section, the base plate comprises a generally rectangular second plate section which is rigidly attached (e.g., spot-welded) to the first plate section. The second plate section itself includes a second channel formed therein which is identically configured to the first channel, and thus defines a spaced pair of enlarged regions. When the first and second plate sections are attached to each other to define the base plate, the enlarged regions of the first channel are generally aligned with respective ones of the enlarged regions of the second channel, with the first and second channels collectively defining the bore which extends longitudinally through the base plate. The first and second plate sections are each preferably fabricated from a metal material, such as stainless steel.

In addition to the base plate, the motor mount insert of the present invention comprises a resilient material which is molded about the base plate in a manner wherein the first and second pairs of tab portions protrude from respective ends thereof. The resilient material is formed to have a maximum material width which is preferably substantially equal to the maximum cavity width of the cavity. The resilient material is also formed to have a maximum material height which preferably exceeds the maximum cavity height of the cavity such that a pre-load is applied to the motor mount insert upon the attachment of the shell to the backing plate subsequent to the motor mount insert being operatively positioned therebetween. The resilient material is preferably formed to include identically configured first and second block sections which are separated by a trough. The first and second block sections are preferably formed to have configurations which are complimentary to those of an identically configured pair of recesses formed in the shell of the motor mount in spaced relation to each other. As such, upon the attachment of the shell to the backing plate subsequent to the motor mount insert being operatively positioned therebetween, the first and second block sections of the resilient material are received into respective ones of the recesses of the shell in a nesting fashion, with such receipt maintaining the motor mount insert in its operative position between the shell and the backing plate. A preferred resilient material for the motor mount insert is polyurethane.

In one embodiment of the present motor mount insert, the resilient material is molded about the base plate such that the first flange portion of the first plate section defining the larger tab portions of the first and second pairs extends away from the first and second block sections of the resilient material (i.e., the second flange portion of the first plate section defining the smaller tab portions of the first and second pairs extends toward the first and second block sections). In an alternative embodiment of the present motor mount insert, the resilient material is molded about the base plate such that the second flange portion of the first plate section defining the smaller tab portions of the first and second pairs extends away from the first and second block sections of the resilient material (i.e., the first flange portion of the first plate section defining the larger tab portions of the first and second pairs extends toward the first and second block sections). Advantageously, by altering the orientation of the base plate within the resilient material in the aforementioned manner, motor mount inserts may be fabricated for use in the two most commonly employed clam shell type motor mounts without the need to modify the structure or configuration of the base plate. The enlarged regions of the first and second channels of the first and second plate sections which collectively define the bore effectively reduce the amount of resilient material needed to be molded to the base plate, thus lowering the fabrication cost of the present motor mount insert.

Further in accordance with the present invention, there is provided a method of fabricating a motor mount insert for retrofit application to a motor mount attachable to an engine bracket having a pair of apertures disposed therein, and including a backing plate and shell which, when attached to each other, collectively define a cavity having a maximum cavity width and a maximum cavity height. The method comprises the initial step of providing a base plate which is formed to define a first end having a first pair of tab portions extending therefrom in spaced relation to each other and a second end having a second pair of tab portions extending therefrom in spaced relation to each other. Thereafter, a resilient material is molded about the base plate such that the first and second pairs of tab portions protrude therefrom and the remainder of the base plate in encapsulated by the resilient material.

In the motor mount insert fabrication method of the present invention, the base plate is preferably formed to include first and second flange portions which extend in spaced, generally parallel relation to each other and each have opposed ends which define respective ones of the tab portions of the first and second pairs, with the tab portions defined by the opposed ends of the first flange portion exceeding the size of the tab portions defined by the opposed ends of the second tab portion. Additionally, the resilient material is preferably formed to include a pair of block sections which extend from a common side thereof, and is molded about the base plate such that the first flange portion defining the larger tab portions extends toward the block sections. Alternatively, the resilient material may be molded about to the base plate such that the second flange portion defining the smaller tab portions extends toward the block sections. The resilient material is preferably formed from polyurethane, and to have a maximum material width which is substantially equal to the maximum cavity width of the cavity and a maximum material height which exceeds the maximum cavity height of the cavity.

Still further in accordance with the present invention, there is provided a method of retrofitting a motor mount attached to an engine bracket and a frame of a vehicle, and including a backing plate, a shell attached to the backing plate, and a rubber core positioned between the backing plate and the shell, with a polyurethane motor mount insert. The retrofit method comprises the initial step of detaching the engine bracket from the motor mount, which is followed by the step of detaching the motor mount from the frame. Thereafter, the shell is separated from the backing plate, with the rubber core then being replaced with the motor mount insert. The shell is then reattached to the backing plate with the motor mount insert being positioned therebetween, with the motor mount retrofitted to include the motor mount insert thereafter being reattached to the frame. Finally, the engine bracket is reattached to the retrofitted motor mount. The motor mount insert preferably includes first and second pairs of tab portions protruding therefrom, with one of the tab portions of each of the first and second pairs exceeding the size of the remaining tab portion of the same pair. In this respect, the step of replacing the rubber core with the motor mount insert preferably comprises positioning the motor mount insert between the backing plate and the shell such that, when the retrofitted motor mount is reattached to the frame, the larger tab portion of each of the first and second pairs will have a prescribed orientation relative thereto.

BRIEF DESCRIPTION OF THE DRAWINGS

These, as well as other features of the present invention, will become more apparent upon reference to the drawings wherein:

FIG. 4 is an exploded view of one of the retrofitted motor mounts shown in FIG. 2;

FIG. 5 is a top perspective view of one of the retrofitted motor mounts shown in FIG. 2;

FIG. 7 is a top perspective view of the base plate of the motor mount insert of the present invention;

FIG. 8 is an exploded view of the base plate shown in FIG. 7;

DETAILED DESCRIPTION OF THE INVENTION

Figure 1:
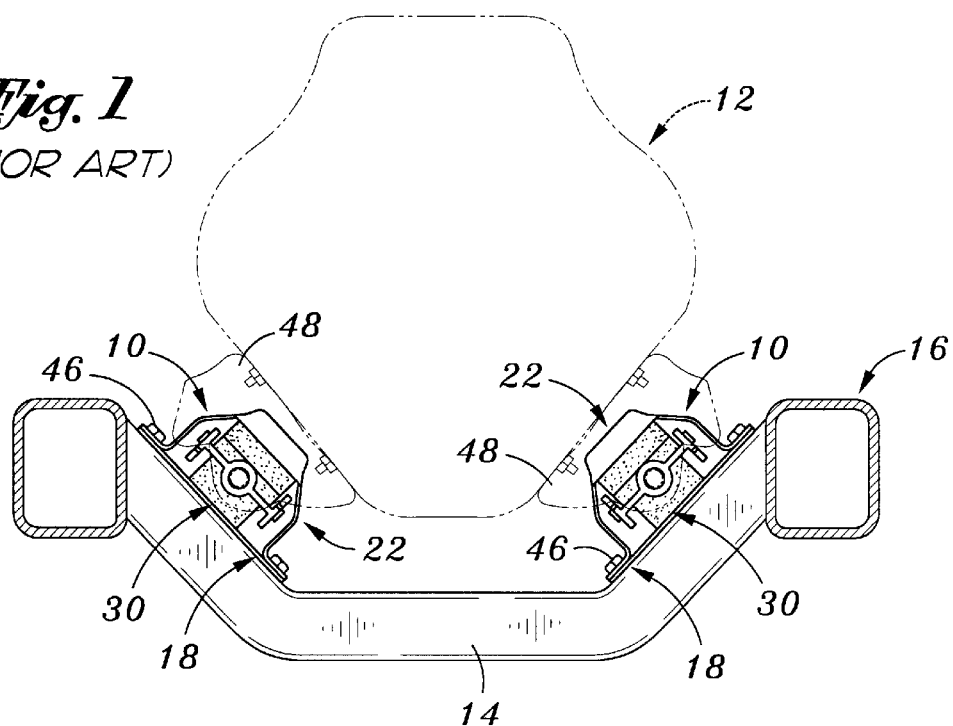
FIG. 1 is a front-elevational view of a pair of prior art clam shell type motor mounts as used to mount an automotive engine to the cross-member of a vehicle frame.

Referring now to the drawings wherein the showings are for purposes of illustrating preferred embodiments of the present invention only, and not for purposes of limiting the same, FIG. 1 is a front-elevational view of a pair of prior art clam shell type motor mounts 10 as used to mount an automotive engine 12 to the cross-member 14 of a vehicle frame 16. The motor mounts 10 are each of the clam shell type, with an exploded view of one of the prior art motor mounts 10 being shown in FIG. 3. The term "motor mount" as used herein will be intended to describe clam shell type motor mounts which are typically made available in the automotive industry in at least two standard sizes.

Figure 3:
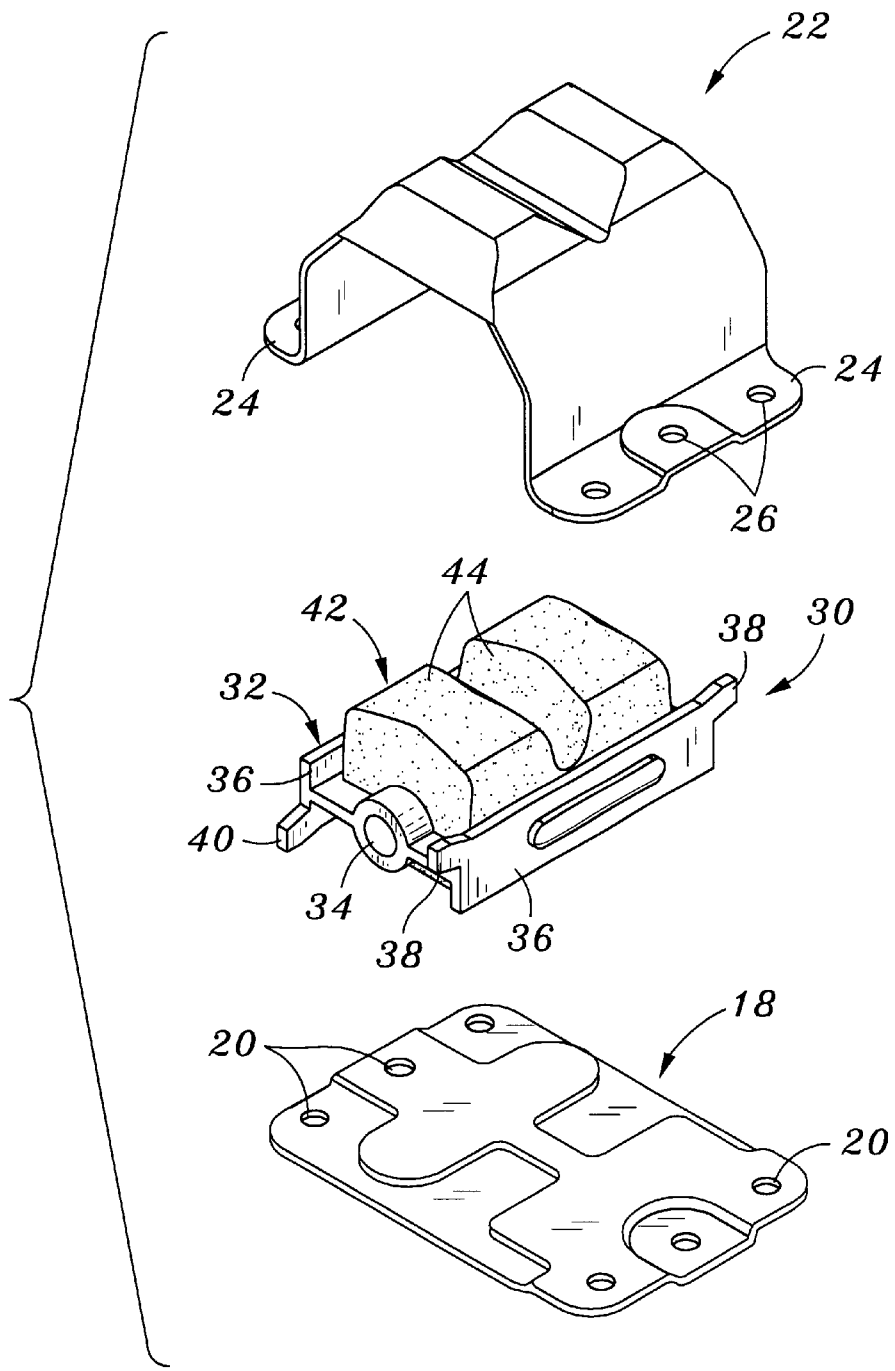
FIG. 3 is an exploded view of one of the prior art motor mounts shown in FIG. 1.
Figure 6:
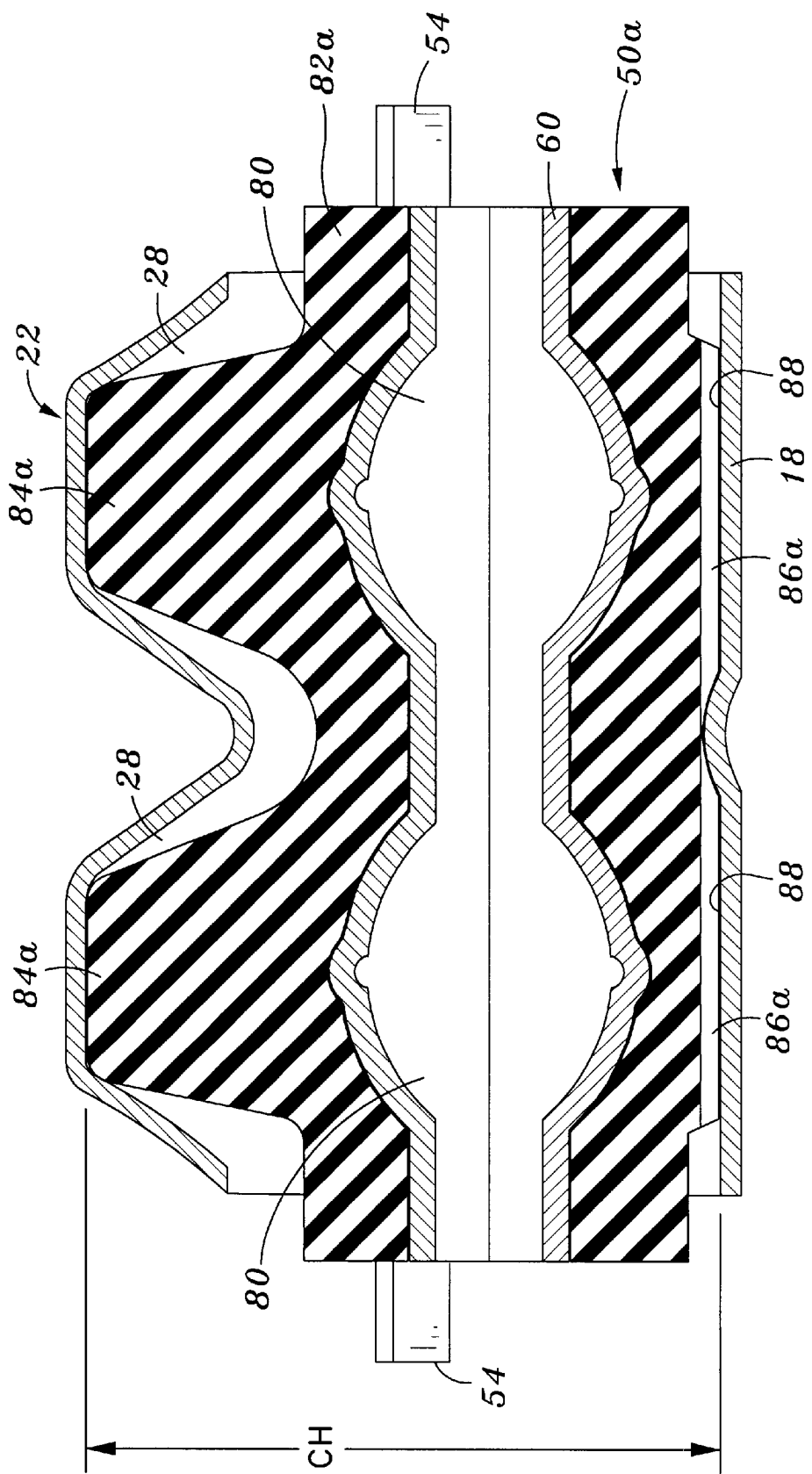
FIG. 6 is cross-sectional view taken along line 6—6 of FIG. 5.

As best seen in FIG. 3, the prior art motor mount 10 comprises a generally rectangular metal backing plate 18 which includes a plurality of apertures 20 disposed therein along respective ones of the opposed lateral edges thereof. In addition to the backing plate 18, the motor mount 10 includes a metal shell 22 which is formed to include a pair of flange portions 24 which extend outwardly from the remainder thereof in opposed relation to each other. Disposed within each of the flange portions 24 is a series of aligned apertures 26. The shell 22 is further formed to include an identically configured, spaced pair of recesses 28 which are best seen in FIG. 6.

The prior art motor mount 10 further comprises a core 30 which is disposed between the backing plate 18 and shell 22. The core 18 comprises a generally rectangular base plate 32 which defines a bore 34 of generally uniform diameter extending longitudinally therethrough. The base plate 32 includes a spaced, generally parallel pair of flange portions 36 which define respective ones of the longitudinal sides thereof and extend in generally perpendicular relation to the remainder of the base plate 32. One of the flange portions 36 includes a pair of tab portions 38 which extend from the tops of respective ones of the opposed ends thereof, with the remaining flange portion 36 including a pair of tab portions 40 which extend from the bottoms of respective ones of the opposed ends thereof.

In addition to the base plate 32, the core 30 comprises rubber material 42 which is molded to each of the opposed faces of the base plate 32 between the flange portions 36. The rubber material 42 molded to one of the sides of the base plate 32 is formed to define a spaced pair of extensions 44 which are receivable into respective ones of the recesses 28 of the shell 22.

In the prior art motor mount 10, the core 30 is positioned upon the backing plate 18, with the shell 22 then being positioned over the core 30 such that the extensions 44 are recieved into the recesses 28 and the apertures 26 within the flange portions 24 of the shell 22 are coaxially aligned with respective ones of the apertures 20 within the backing plate 18. The backing plate 18 and shell 22 are then spot-welded to each other, thus permanently maintaining the core 30 therebetween.

Referring again to FIG. 1, the attachment of the motor mount 10 to the cross-member 14 of the vehicle frame 16 is typically accomplished by positioning the backing plate 18 upon the top surface of the cross-member 14. The backing plate 18 is oriented such that the coaxially aligned pairs of apertures 24, 20 are themselves coaxially aligned with respective apertures extending through the cross-member 14. Mounting bolts 46 are then advanced through such coaxially aligned sets of apertures, with nuts then being applied to exposed ends of the mounting bolts 46 protruding from the side of the cross-member 14 opposite that having the backing plate 18 of the motor mount 10 positioned thereupon.

Each prior art motor mount 10 is specifically configured to cooperatively engage a corresponding engine bracket 48 attached to the engine 12. More particularly, each motor mount 10 is configured such that a respective engine bracket 48 may be advanced thereover in a manner wherein a pair of apertures disposed within the engine bracket 48 are placeable into coaxial alignment with the bore 34 of the base plate 32 of the core 30. Once such coaxial alignment has been achieved, a long bolt is advanced through the coaxially aligned apertures and bore 34, thus facilitating the attachment of the engine bracket 48 to the motor mount 10. The base plate 32 of the core 30 is formed such that the tab portions 38, 40 defined thereby engage the engine bracket 48 in a manner which facilitates the coaxial alignment of the apertures of the engine bracket 48 with the bore 34 of the base plate 18. More particularly, the engine bracket 48, when advanced over the shell 22 of the motor mount 10, engages the tab portions 38, 40 at each end of the core 30, with such engagement resulting in the apertures of the engine bracket 48 and bore 34 of the base plate 32 being placed in coaxial alignment with each other, thus allowing for the passage of the long bolt therethrough to facilitate the attachment of the engine bracket 48 to the motor mount 10.

As will be discussed in more detail below, the present invention is directed to a motor mount insert 50, 50a which is specifically adapted for retrofit application to the motor mount 10 to serve as a substitute for the core 30. In this respect, the motor mount insert 50, 50a of the present invention is sized and configured for use in conjunction with the backing plate 18 and shell 22 of the prior art motor mount 10. As will also be discussed in more detail below, the retrofit of the motor mount 10 to include the motor mount insert 50, 50a of the present invention requires that the backing plate 18 and shell 22 which are spot-welded to each other in the prior art motor mount 10 first be detached from each other. Having thus described the structural attributes of the prior art motor mount 10, the motor mount insert 50, 50a of the present invention will now be described with particular reference to FIGS. 2 and 4–10.

Figure 2:
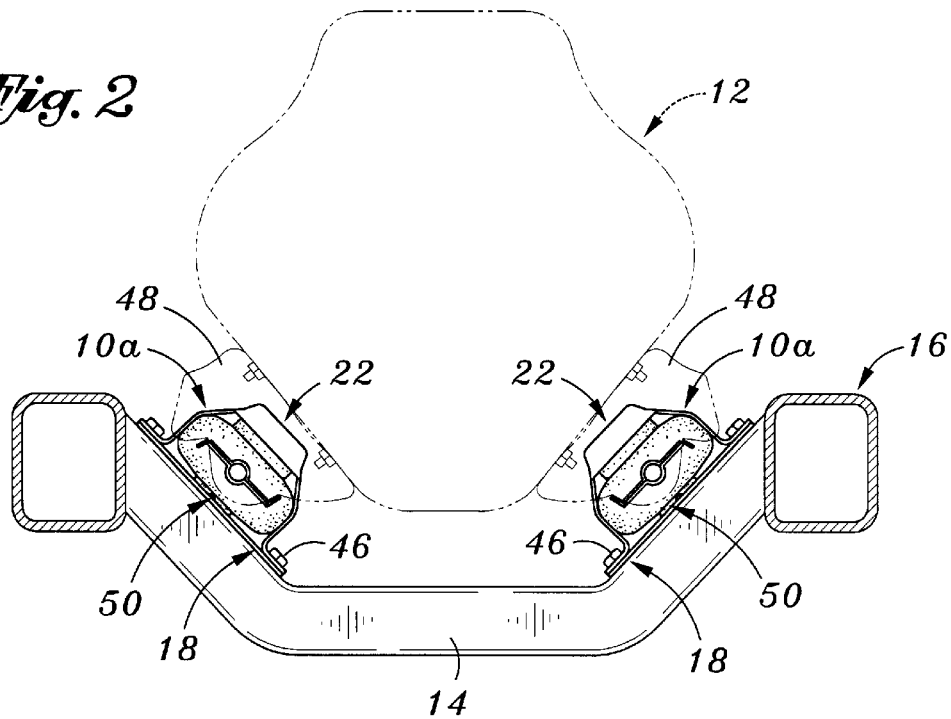
FIG. 2 is a front-elevational view similar to FIG. 1, illustrating the prior art clam shell type motor mounts as retrofitted to include the motor mount inserts of the present invention in substitution for the prior art rubber cores of the motor mounts.

FIG. 2 is a front-elevational view similar to FIG. 1, and depicts a pair of motor mounts 10a as used to mount the engine 12 to the cross-member 14 of the vehicle frame 16. The motor mounts 10a differ from the previously described motor mounts 10 in that they have been retrofitted to substitute the motor mount insert 50 of the present invention for the aforementioned prior art core 30. However, as indicated above, the motor mounts 10a, though retrofitted to include the motor mount inserts 50 of the present invention, each still include the above-described backing plate 18 and shell 22.

Referring now to FIGS. 6–9, the motor mount insert 50 of the present invention comprises a base plate 52 which defines a first end having a first pair of tab portions 54 extending therefrom in spaced relation to each other, and an opposed second end having a second pair of tab portions 56 extending therefrom in spaced relation to each other. The base plate 52 further defines an elongate bore 58 which extends therethrough. In the preferred embodiment, the base plate 52 itself comprises a general rectangular first plate section 60 having a first channel 62 formed therein, and first and second flange portions 64, 66 extending therefrom in spaced, generally parallel relation to each other. More particularly, the first plate section 60 includes a body portion 68, with the first and second flange portions 64, 66 extending along and from respective ones of the opposed longitudinal sides of the body portion 68 in opposite directions. The first and second flange portions 64, 66 preferably extend angularly relative to the body portion 68, and each have opposed ends which define respective ones of the tab portions 54, 56 of the first and second pairs. As is best seen in FIG. 7, the tab portions 54, 56 of the first and second pairs defined by respective ones of the opposed ends of the first flange portion 64 exceed the size of the tab portions 54, 56 of the first and second pairs defined by respective ones of the opposed ends of the second flange portion 66.

In addition to the first plate section 60, the base plate 52 comprises a generally rectangular second plate section 74 which is rigidly attached (e.g., spot-welded) to the first plate section 60. The second plate section 74 is also rectangularly configured. The second plate section 74 is formed to include a plurality of notches 76 which are formed in respective ones of the opposed longitudinal sides thereof. The second plate section 74 also includes a second channel 78 formed therein which is identically configured to the first channel 62 of the first plate section 60, and thus defines a spaced pair of enlarged regions 80. In assembling the base plate 52, the second plate section 74 is positioned upon the first plate section 60 such that the notches 76 are aligned with respective ones of the apertures 72 in the manner best shown in FIG. 7. The aligned notches 76 and apertures 72 provide defined areas where the first and second plate sections 60, 74 are spot-welded to each other. Additionally, when the first and second plate sections 60, 74 are attached to each other, the enlarged regions 70 of the first channel 62 are generally aligned with respective ones of the enlarged regions 80 of the second channel 78 in the manner best seen in FIG. 6. The first and second channels 62, 78 collectively define the bore 58 which extends longitudinally through the approximate center of the base plate 52. The first and second plate sections 60, 74 are each preferably fabricated from a metal material, such as stainless steel.

Figure 9:
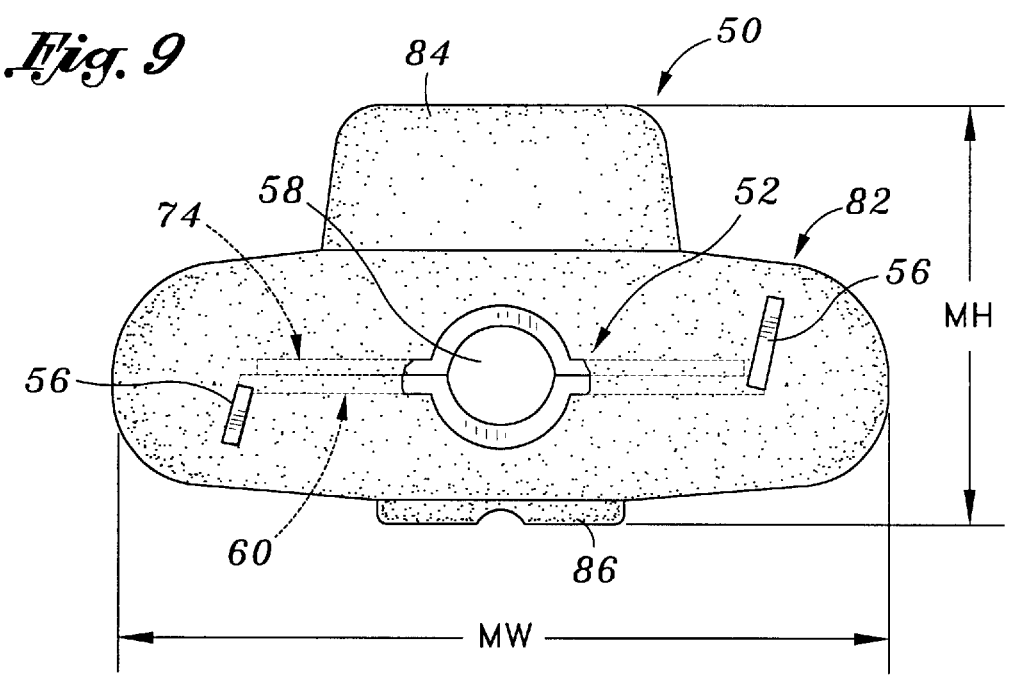
FIG. 9 is a front-elevational view of an alternative embodiment of the motor mount insert of the present invention with the base plate being in the orientation shown in FIGS. 2 and 7.
Figure 10:
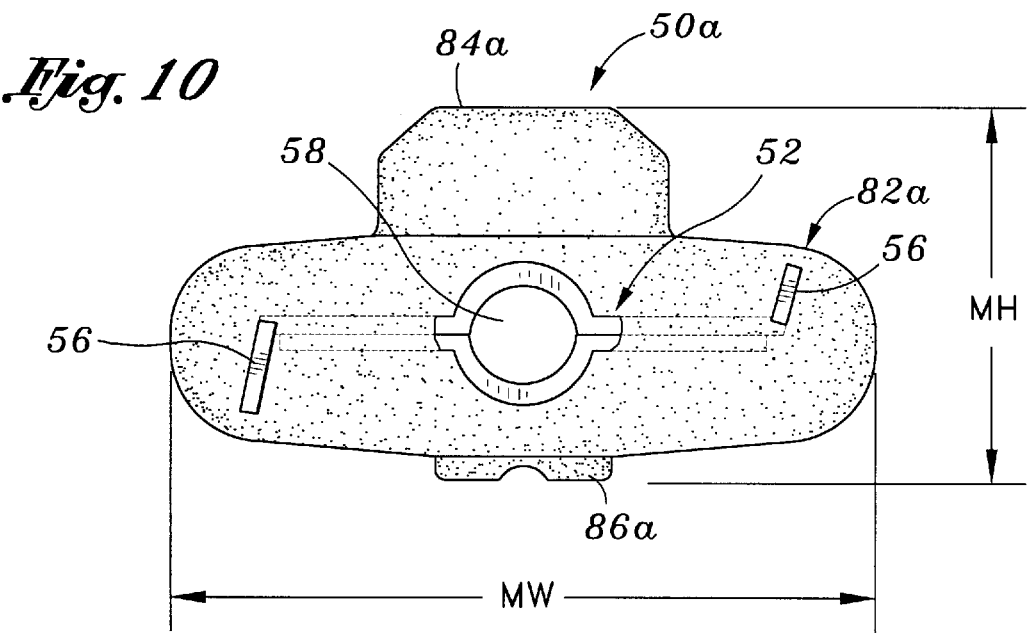
FIG. 10 is a front-elevational view of the motor mount insert of the present invention with the base plate being in orientation shown in FIGS. 4 and 5.

In addition to the base plate 52, the motor mount insert 50 comprises a resilient material 82 which is molded about the base plate 52 in a manner wherein the first and second pairs of tab portions 54, 56 protrude from respective ends of the resilient material 82. When the shell 22 is secured to the backing plate 18 in the manner shown in FIGS. 1 and 2, a cavity is collectively defined thereby which has a maximum cavity width CW and a maximum cavity height CH. The maximum cavity height CH is shown in FIG. 6, and is the distance between the backing plate 18 and the bottoms of the recesses 28 formed with the shell 22. The maximum cavity width CW is shown in FIG. 5, and is the distance separating the opposed, parallel sidewalls of the shell 22 from each other. In the motor mount insert 50 of the present invention, the resilient material 82 is preferably formed to have a maximum material width MW as shown in FIGS. 9 and 10 which is preferably substantially equal to, but slightly less than, the maximum cavity width CW of the motor mount cavity. The resilient material 82 is also formed to have a maximum material height MH as also shown in FIGS. 9 and 10 which preferably exceeds the maximum cavity height CH of the motor mount cavity such that a pre-load is applied to the motor mount insert 50 upon the attachment of the shell 22 to the backing plate 18 subsequent to the motor mount insert 50 being operatively positioned therebetween, as will be discussed in more detail below.

The resilient material 82 is preferably formed to include identically configured first and second block sections 84 which are separated by a trough. The first and second block sections 84 are preferably formed to have configurations which are complimentary to those of the recesses 28 within the shell 22, with the spacing between the block sections 84 being generally equal to the spacing between the recesses 28. As such, upon the attachment of the shell 22 to the backing plate 18 subsequent to the motor mount insert 50 being operatively positioned therebetween, the first and second block sections 84 of the resilient material 82 are received into respective ones of the recesses 28 in the manner shown in FIG. 6, with such receipt maintaining the motor mount insert 50 in its operative position between the shell 22 and the backing plate 18.

The side of the resilient material 82 opposite that including the block sections 84 formed thereon is not generally planar but rather includes a spaced pair of bumper members 86 protruding therefrom. The bumper members 86 are oriented on the resilient member 82 so as to be receivable in nesting fashion into respective ones of a complimentary pair of recesses 88 formed upon that surface of the backing plate 18 upon which the motor mount insert 50 is to be positioned. The bumper members 86, like the block sections 84, assist in maintaining the motor mount insert 50 in its operative position between the shell 22 and backing plate 18. A preferred resilient material 82 for the motor mount insert 50 is polyurethane.

As is seen in FIGS. 2, 7 and 9, the resilient material 82 is molded about the base plate 52 such that the second flange portion 66 of the first plate section 60 defining the smaller tab portions 54, 56 of the first and second pairs extends away from the first and second block sections 84 of the resilient material 82 (i.e., the first flange portion 64 of the first plate section 60 defining the larger tab portions 54, 56 of the first and second pairs extends toward the first and second block sections 84).

Referring now to FIGS. 4–6 and 10, further in accordance with the present invention, a motor mount insert 50*a* may be provided which is substantially similar to the previously described motor mount 50, and comprises resilient material 82*a* which is molded about the same base plate 52 as described in relation to the motor mount insert 50. However, in the motor mount insert 50*a,* the resilient material 82*a* is molded about the base plate 52 such that the first flange portion 64 of the first plate section 60 defining the larger tab portions 54, 56 of the first and second pairs extends away from the first and second block sections 84*a* of the resilient material 82*a* (i.e., the second flange portion 66 of the first plate section 60 defining the smaller tab portions 54, 56 of the first and second pairs extends toward the first and second block sections 84*a*).

The motor mount insert 50*a* is, as indicated above, substantially similar to the above-described motor mount insert 50, with the primary differences being the orientations of the smaller and larger tab portions 54, 56 of the first and second pairs as described above, the block sections 84*a* of the resilient material 82*a* having beveled lateral edges, and the bumper members 86*a* of the resilient material 82*a* being slightly smaller than the bumper members 86 of the resilient material 82. The motor mount inserts 50, 50*a* are both adapted for retrofit application to the clam shell type motor mounts, with the motor mount insert 50*a* being used in relation to a motor mount 10 wherein the shell 22 and backing plate 18 are slightly smaller than those with which the motor mount insert 50 is used. The different size motor mounts 10 in which the motor mount inserts 50, 50*a* are used represent the two most common clam shell type motor mounts currently used in the automotive industry. As will be recognized, two different molds will typically be employed for the fabrication of the motor mount insert 50 and motor mount insert 50*a* due to the size of the resilient material 82*a* in the motor mount insert 50*a* being smaller than the resilient material 82, and the block sections 84*a* and bumper members 86*a* of the resilient material 82*a* having slightly different configurations than those of the block sections 84 and bumper members 86 of the resilient material 82. With regard to the base plate 52 which is incorporated into each of the motor mount inserts 50, 50*a,* when viewing the motor mount inserts 50, 50*a* from the perspectives shown in FIGS. 9 and 10, the base plate 52 is rotated one hundred eighty degrees (180°) in a counterclockwise direction from its orientation within the mold used to form the motor mount insert 50 when placed into the mold used to form the motor mount insert 50*a*. As with the motor mount insert 50, the motor mount insert 50*a* has a maximum material height MH which exceeds the maximum cavity height CH of the cavity defined between the shell 22 and backing plate 18 between which it is operatively positioned, with the maximum material width MW of the motor mount insert 50*a* being substantially equal to, but slightly less than, the maximum cavity width CW of such motor mount cavity.

Advantageously, by altering the orientation of the base plate 52 within the resilient material 82, 82*a* in the aforementioned manner, the motor mount inserts 50, 50*a* may be fabricated for use in the two most commonly employed clam shell type motor mounts without the need to modify the structure or configuration of the base plate 52. In the base plate 52, the enlarged regions 70, 80 of the first and second channels 62, 78 which collectively define the bore 58 effectively reduce the amount of resilient material 82, 82*a* needed to be molded to the base plate 52, thus lowering the fabrication costs of each of the motor mount inserts 50, 50*a*.

The motor mount insert 50 of the present invention is preferably formed by inserting the base plate 52 into an appropriately configured mold, and thereafter injection molding the resilient material 82 (e.g., the polyurethane) about the base plate 52 such that only the first and second pairs of tab portions 54, 56 protrude from the resilient material 82, with the remainder of the base plate 52 being encapsulated thereby. As will be recognized, in the motor mount insert 50, the base plate 52 will be positioned in the mold cavity such that the first flange portion 64 (defining the larger tab portions 54, 56) will extend toward the block sections 84 of the resilient material 82 upon the completion of the molding process. The same sequence of steps is generally followed to facilitate the fabrication of the motor mount insert 50*a*. However, as will be recognized, the mold cavity used to facilitate the fabrication of the motor mount insert 50*a* will have a slightly different configuration than that used to form the motor mount insert 50. Additionally, in forming the motor mount insert 50*a,* the base plate 52 will be oriented within the mold cavity such that the second flange portion 56 (defining the smaller tab portions 54, 56) will extend toward the block sections 84*a* of the resilient material 82*a*.

Having thus described the structural attributes of the motor mount inserts 50, 50*a,* a preferred method of retrofitting the prior art motor mount 10 to include either of the motor mount inserts 50, 50*a* of the present invention will now be discussed with specific reference to FIGS. 1 and 2. As the initial step of the retrofit method, the engine brackets 48 are detached from the motor mounts 10, with a engine hoist typically being used to raise the engine 12. The engine 12 must be raised to a height needed to remove load from the motor mounts 10. As will be recognized, the detachment of the engine brackets 48 from the motor mounts 10 entails removing the aforementioned long bolts used to pivotally connect the engine brackets 48 to the motor mounts 10.

Upon the engine brackets 48 being detached therefrom and the engine 12 being lifted, the motor mounts 10 are detached from the cross-member 14 of the vehicle frame 16 by removing the mounting bolts 46. Upon the motor mounts 10 being detached from the cross-member 14, the backing plates 18 and shells 22 thereof are inspected for damage. Thereafter, a three-eighths inch drill bit is used to drill out the rivets/welds to secure each shell 22 to a respective backing plate 18. Typically, these rivets/welds are disposed within certain pairs of the coaxially aligned apertures 20, 26. The drilled holes must have a diameter of at least five-sixteenths of an inch. Subsequent to the separation of a shell 22 from a respective backing plate 18, burrs or sharp edges are removed from the drilled out holes, with any dirt and grease that may have accumulated inside the shell 22 and backing plate 18 then being cleaned. At this juncture, the shell 22 and backing plate 18 may be painted, powder coated, or chromed.

Subsequent to the shell 22 being detached from a respective backing plate 18, the core 30 is removed from therebetween, and replaced with either the motor mount insert 50 or motor mount insert 50a. In positioning either of the motor mount inserts 50, 50a between the backing plate 18 and shell 22, it is important to note how the motor mount 10 attaches to the cross-member 14 of the vehicle frame 16. In most applications, when the motor mount insert 50 is used, it is positioned between the backing plate 18 and shell 22 such that when the retrofitted motor mount 10a is reattached to the cross-member 14, the first flange portion 64 (defining the larger tab portions 54, 56) will be directed toward the bottom of the cross-member 14. Similarly, when the motor mount insert 50a is employed in the retrofit operation, it is typically oriented between the backing plate 18 and shell 22 such that the second flange portion 66 (defining the smaller tab portions 54, 56) is directed toward the bottom of the cross-member 14. Importantly, the tab portions 54, 56 of the first and second pairs are oriented in this manner relative to the cross-member 14 such that when the engine brackets 48 are reattached to the retrofitted motor mounts, the engine brackets 48 will engage the tab portions 54, 56 of the first and second pairs in a manner wherein the apertures of each engine bracket 48 will be coaxially aligned with a respective bore 58, thus allowing for the advancement of the long bolt therethrough.

Upon the rubber core 30 being replaced with the motor mount inserts 50, 50a in the above-described manner, the shell 22 is realigned with the backing plate 18 such that the apertures 26 are coaxially aligned with respective ones of the apertures 20, with either of the motor mount insert 50, 50a being disposed therebetween. The assembly may be placed in a vise or large clamp leaving access to the drilled out holes. Enough clamping force is used to hold the shell 22 and backing plate 18 together without permanently deforming the metal, although a slight amount of metal bending may occur which is normal. To temporarily hold the assembly together, tie-wraps may be used in the drilled holes, inserting them from the bottom side, and leaving the locking end of the tie-wrap on the top side. Care must be taken to make sure that the tie-wraps are holding firm while releasing the clamp or vise. Upon such release, the shell 22 and backing plate 18 may separate slightly, which is normal. However, excessive separation will prevent the mounting bolts 46 from reaching through the cross-member 14 allowing the nuts to be started thereon when the retrofitted motor mount is reattached to the vehicle frame 16. The ends of the tie-wraps are then cut off so as not to leave any sharp edges.

The retrofitted motor mounts are then reattached to the cross-member 14 of the vehicle frame, with all the mounting bolts 46 being left loosened until the long bolts used to pivotally connect the engine brackets 48 to the retrofitted motor mounts are advanced through respective ones of the bores 58. Thereafter, the mounting bolts 46 are tightened, with the retrofit installation of the motor mount inserts 50, 50a into the prior art motor mount 10 then being completed. As indicated above, the reattachment of the retrofitted motor mounts to the cross-member 14 is accomplished in a manner wherein the apertures of the engine brackets 48, when reattached to the retrofitted motor mounts, will be coaxially aligned with respective ones of the bores 58 so as to allow the advancement of the long bolts therethrough. Once the motor mount 10 has been retrofitted to include either of the motor mount inserts 50, 50a the sizing of the motor mount insert 50, 50a, to have a maximum material width MW which is substantially equal to, but only slightly less than, the maximum cavity width CW of the motor mount cavity substantially eliminates open space between the opposed longitudinal sides of the resilient material 82, 82a and the sidewalls of the shell 22. Such elimination of the open space reduces twist and torque moment when the retrofitted motor mount is used to support the engine 12.

Additional modifications and improvements of the present invention may also be apparent to those of ordinary skill in the art. Thus, the particular combination of parts and illustrated herein is intended to represent only certain embodiments of the present invention, and is not intended to serve as limitations of alternative devices within the spirit and scope of the invention.

I claim:

1. A motor mount insert for retrofit application to a motor mount attachable to an engine bracket having a pair of apertures disposed therein, and including a backing plate and a shell which, when attached to each other, collectively define a cavity having a maximum cavity width and a maximum cavity height, the motor mount insert being positionable between the shell and the backing plate and comprising:

a base plate including first and second generally parallel plate sections directly attached to each other and defining:
opposed first and second ends;
an elongate bore extending therethrough; and
first and second flange portions extending in spaced relation to each other, each of the first and second flange portions having opposed ends which protrude beyond respective ones of the first and second ends;
the ends of the first and second flange portions protruding beyond the first end defining a first pair of tab portions, with the ends of the first and second flange portions protruding beyond the second end defining a second pair of tab portions;

a resilient material molded about the base plate in a manner wherein the first and second pairs of tab portions protrude therefrom, the resilient material being formed to have a maximum material width which is substantially equal to the maximum cavity width of the cavity;

the motor mount insert being sized and configured such that the advancement of the engine bracket over the shell subsequent to the motor mount insert being positioned between the backing plate and the shell results in the engagement of the engine bracket to the tab portions of the base plate which facilitates the co-axial alignment of the apertures of the engine bracket with the bore of the base plate.

2. The motor mount insert of claim 1 wherein the resilient material is polyurethane.

3. The motor mount insert of claim 1 wherein the resilient material is adapted to be formed to have a maximum material height which exceeds the maximum cavity height of the cavity such that a pre-load is applied to the motor mount insert upon the attachment of the shell to the backing plate subsequent to the motor mount insert being operatively positioned therebetween.

4. The motor mount insert of claim 3 wherein:

the resilient material includes identically configured first and second block sections which extend from a common side thereof in spaced relation to each other; and the first and second block sections have configurations which are adapted to be complimentary to an identically configured, spaced pair of recesses in the shell of the motor mount so as to be receivable into respective ones of the recesses upon the attachment of the shell to the backing plate.

5. The motor mount insert of claim 1 wherein the generally rectangular first plate section having a first channel formed therein and including the first and second flange portions extending longitudinally therealong in spaced relation to each other; and wherein the generally rectangular second plate section has a second channel formed therein, with the first and second channels collectively defining the bore which extends longitudinally within the base plate when the first and second plate sections are attached to each other.

6. The motor mount insert of claim 5 wherein the first and second channels are each formed to include a pair of enlarged regions, the enlarged regions of the first channel being in substantial alignment with respective ones of the enlarged regions of the second channel when the first and second plate sections are attached to each other.

7. The motor mount insert of claim 5 wherein the tab portions of the first and second pairs defined by respective ones of the opposed ends of the first flange portion exceed the size of the tab portions of the first and second pairs defined by respective ones of the opposed ends of the second flange portion.

8. The motor mount insert of claim 7 wherein the first plate section of the base plate further includes a body portion defining opposed longitudinal sides, and the first and second flange portions extend along and from respective ones of the longitudinal sides of the body portion in opposite directions.

9. The motor mount insert of claim 8 wherein the first and second flange portions of the first plate section extend angularly relative to the body portion thereof.

10. The motor mount insert of claim 9 wherein:

the resilient material includes first and second block sections which extend from a common side thereof; and the resilient material is molded about the base plate such that the first flange portion of the first plate section extends away from the first and second block sections of the resilient material.

11. The motor mount insert of claim 9 wherein:

the resilient material defines first and second block sections which extend from a common side thereof; and the resilient material is molded about the base plate such that the second flange portion of the first plate section extends away from the first and second block sections of the resilient material.

12. The motor mount insert of claim 5 wherein the first and second plate sections are each fabricated from a metal material.

13. A method of fabricating a motor mount insert for retrofit application to a motor mount attachable to an engine bracket having a pair of apertures disposed therein, and including a backing plate and a shell which, when attached to each other, collectively define a cavity having a maximum cavity width and a maximum cavity height, the method comprising the a) providing a base plate including first and second generally parallel plate sections directly attached to each other and which is formed to define opposed first and second ends and first and second flange portions extending in spaced relation to each other, each of the first and second flange portions having opposed ends which protrude beyond respective ones of the first and second ends, with the ends of the first and second flange portions protruding beyond the first end defining a first pair of tab portions and the ends of the first and second flange portions protruding beyond the second end defining a second pair of tab portions; and b) molding a resilient material about the base plate such that the first and second pairs of tab portions protrude therefrom and the remainder of the base plate including the first and second flange portions is encapsulated by the resilient material.

14. The method of claim 13 wherein:

step (a) comprises forming the base plate such that the tab portions defined by the opposed ends of the first flange portion exceed the size of the tab portions defined by the opposed ends of the second flange portion; and step (b) comprises:
1) forming the resilient material to include a pair of block sections which extend from a common side thereof; and
2) molding the resilient material about the base plate such that the first flange portion extends toward the block sections.

15. The method of claim 13 wherein:

step (a) comprises forming the base plate such that the tab portions defined by the opposed ends of the first flange portion exceed the size of the tab portions defined by the opposed ends of the second flange portion; and step (b) comprises:
1) forming the resilient material to include a pair of block sections which extend from a common side thereof; and
2) molding the resilient material about the base plate such that the second flange portion extends toward the block sections.

16. The method of claim 13 wherein step (b) comprises molding polyurethane about the base plate.

17. The method of claim 13 wherein step (b) comprises molding the resilient material to have a maximum material width which is substantially equal to the maximum cavity width of the cavity.

18. The method of claim 17 wherein step (b) comprises molding the resilient material to have a maximum material height which exceeds the maximum cavity height of the cavity.

19. A method of retrofitting a motor mount attached to an engine bracket and a frame of a vehicle, and including a backing plate, a shell attached to the backing plate, and a rubber core portioned between the backing plate and the shell, with a polyurethane motor mount insert including a base plate having first and second generally parallel plate sections directly attached to each other, and further including first and second pairs of tab portions protruding therefrom, with one of the tab portions of each of the first and second pairs exceeding the size of the remaining tab portion of the same pair, the method comprising the steps of:

a) detaching the engine bracket from the motor mount;
b) detaching the motor mount from the frame;
c) separating the shell from the backing plate;
d) positioning the motor mount insert between the backing plate and the shell such that the larger tab portion of each of the first and second pairs of the tab portions will have a prescribed orientation relative to the frame when the motor mount is reattached thereto;
e) reattaching the shell to the backing plate with the motor mount insert being positioned therebetween;
f) reattaching the motor mount retrofitted to include the motor mount insert to the frame; and
g) reattaching the engine bracket to the retrofitted motor mount. protrude from the resilient material, with the remainder of the base plate being encapsulated thereby.

20. A motor mount insert for retrofit application to a motor mount attachable to an engine bracket having a pair of apertures disposed therein, and including a backing plate and a shell which, when attached to each other, collectively define a cavity having a maximum cavity width and a maximum cavity height, the motor mount insert being positionable between the shell and the backing plate and comprising:
  a base plate having first and second generally parallel plate sections directly attached to each other and defining:
    a first end having a first pair of tab portions extending therefrom in spaced relation to each other;
    a second end having a second pair of tab portions extending therefrom in spaced relation to each other; and
    an elongate bore extending therethrough;
  a resilient material molded about the base plate in a manner wherein the first and second tab portions protrude therefrom, the resilient material being adapted to be formed to have a maximum material width which is substantially equal to the maximum cavity width of the cavity and a maximum material height which exceeds the maximum cavity height of the cavity such that a pre-load is applied to the motor mount insert upon the attachment of the shell to the backing plate subsequent to the motor mount insert being operatively positioned therebetween, the resilient material further including identically configured first and second block sections which extend from a common side thereof in spaced relation to each other, with the first and second block sections having configurations which are adapted to be complementary to an identically configured, spaced pair of recesses in the shell of the motor mount so as to be receivable into respective ones of the recesses upon the attachment of the shell to the backing plate;
  the motor mount insert being sized and configured such that the advancement of the engine bracket over the shell subsequent to the motor mount insert being positioned between the backing plate and the shell results in the engagement of the engine bracket to the tab portions of the base plate which facilitates the co-axial alignment of the apertures of the engine bracket with the bore of the base plate.

21. A motor mount insert for retrofit application to a motor mount attachable to an engine bracket having a pair of apertures disposed therein, and including a backing plate and a shell which, when attached to each other, collectively define a cavity having a maximum cavity width and a maximum cavity height, the motor mount insert being positionable between the shell and the backing plate and comprising:
  a base plate defining:
    a generally rectangular first plate section having opposed first and second ends, a first channel formed therein, and first and second flange portions extending longitudinally therealong in spaced relation to each other, the first and second flange portions each having opposed ends defining first and second pairs of tab portions which extend beyond respective ones of the first and second ends; and
    a generally rectangular second plate section having a second channel formed therein, the second plate section being attached to the first plate section, with the first and second channels collectively defining an elongate bore which extends longitudinally within the base plate when the first and second plate sections are attached to each other;
    the first and second channels each being formed to include a pair of enlarged regions, with the enlarged regions of the first channel being in substantial alignment with respective ones of the enlarged regions of the second channel when the first and second plate sections are attached to each other;
  a resilient material molded about the base plate in a manner wherein the first and second pairs of tab portions protrude therefrom, the resilient material being formed to have a maximum material width which is substantially equal to the maximum cavity width of the cavity;
  the motor mount insert being sized and configured such that the advancement of the engine bracket over the shell subsequent to the motor mount insert being positioned between the backing plate and the shell results in the engagement of the engine bracket to the tab portions of the base plate which facilitates the co-axial alignment of the apertures of the engine bracket with the bore of the base plate.

22. A motor mount insert for retrofit application to a motor mount attachable to an engine bracket having a pair of apertures disposed therein, and including a backing plate and a shell which, when attached to each other, collectively define a cavity having a maximum cavity width and a maximum cavity height, the motor mount insert being positionable between the shell and the backing plate and comprising:
  a base plate defining:
    a generally rectangular first plate having opposed first and second ends, a first channel formed therein, and first and second flange portions extending longitudinally therealong in spaced relation to each other, the first and second flange portions each having opposed ends defining first and second pairs of tab portions which extend from respective ones of the first and second ends, the tab portions of the first and second pairs defined by respective ones of the opposed ends of the first flange portion exceeding the size of the tab portions of the first and second pairs defined by respective ones of the opposed ends of the second flanges portion; and
    a generally rectangular second plate section having a second channel formed therein, the second plate section being attached to the first plate section, with the first and second channels collectively defining an elongate bore which extends longitudinally within the base plate when the first and second plate sections are attached to each other;
  a resilient material molded about the base plate in a manner wherein the first and second pairs of tab portions protrude therefrom, the resilient material being formed to have a maximum material width which is substantially equal to the maximum cavity width of the cavity;

the motor mount insert being sized and configured such that the advancement of the engine bracket over the shell subsequent to the motor mount insert being positioned between the backing plate and the shell results in the engagement of the engine bracket to the tab portions of the base plate which facilitates the co-axial alignment of the apertures of the engine bracket with the bore of the base plate.

23. The motor mount insert of claim 22 wherein the first plate section of the base plate further includes a body portion defining opposed longitudinal sides, and the first and second flange portions extend along and from respective ones of the longitudinal sides of the body portion in opposite directions.

24. The motor mount insert of claim 23 wherein the first and second flange portions of the first plate section extend angularly relative to the body portion thereof.

25. The motor mount insert of claim 24 wherein:

the resilient material includes first and second block sections which extend from a common side thereof; and the resilient material is molded about the base plate such that the first flange portion of the first plate section extends away from the first and second block sections of the resilient material.

26. The motor mount insert of claim 24 wherein:

the resilient material defines first and second block sections which extend from a common side thereof; and the resilient material is molded about the base plate such that the second flange portion of the first plate section extends away from the first and second block sections of the resilient material.

27. A method of fabricating a motor mount insert for retrofit application to a motor mount attachable to an engine bracket having a pair of apertures disposed therein, and including a backing plate and a shell which, when attached to each other, collectively define a cavity having a maximum cavity width and a maximum cavity height, the method comprising the steps of:

a) providing a base plate including first and second generally parallel plate sections directly attached to each other and which includes opposed first and second ends and first and second flange portions which extend in spaced, generally parallel relation to each other and each have opposed ends defining first and second pairs of tab portions extending from respective ones of the first and second ends, the tab portions defined by the opposed ends of the first flange portion exceeding the size of the tab portions defined by the opposed ends of the second flange portion; and b) molding a resilient material formed to include a pair of block sections which extend from a common side thereof about the base plate such that the first flange portion extends toward the block sections and the first and second pairs of tab portions protrude from the resilient material, with the remainder of the base plate being encapsulated thereby.

28. A method of fabricating a motor mount insert for retrofit application to a motor mount attachable to an engine bracket having a pair of apertures disposed therein, and including a backing plate and a shell which, when attached to each other, collectively define a cavity having a maximum cavity width and a maximum cavity height, the method comprising the steps of:

a) providing a base plate including first and second generally parallel plate sections directly attached to each other and which includes opposed first and second ends and first and second flange portions which extend in spaced, generally parallel relation to each other and each have opposed ends defining first and second pairs of tab portions extending from respective ones of the first and second ends, the tab portions defined by the opposed ends of the first flange portion exceeding the size of the tab portions defined by the opposed ends of the second flange portion; and b) molding a resilient material formed to include a pair of block sections which extend from a common side thereof about the base plate such that the second flange portion extends toward the block sections and the first and second pairs of tab portions protrude from the resilient material, with the remainder of the base plate being encapsulated thereby.

* * * * *